United States Patent
Gelonese (10) Patent No.: US 10,102,595 B2
(45) Date of Patent: Oct. 16, 2018

(54) POWER SYSTEM

(71) Applicant: EMBERTEC PTY LTD, Dulwich, South Australia (AU)

(72) Inventor: Domenico Gelonese, Dulwich (AU)

(73) Assignee: EMBERTEC PTY LTD (AU)

( * ) Notice: Subject to any disclaimer, the term of this patent is extended or adjusted under 35 U.S.C. 154(b) by 873 days.

(21) Appl. No.: 14/382,561

(22) PCT Filed: Mar. 8, 2013

(86) PCT No.: PCT/AU2013/000236
§ 371 (c)(1),
(2) Date: Sep. 3, 2014

(87) PCT Pub. No.: WO2013/131147
PCT Pub. Date: Sep. 12, 2013

(65) Prior Publication Data
US 2015/0039429 A1 Feb. 5, 2015

(30) Foreign Application Priority Data

Mar. 8, 2012 (AU) ................................ 2012900925

(51) Int. Cl.
*G06Q 50/06* (2012.01)
*G06Q 10/00* (2012.01)
*G06Q 30/02* (2012.01)

(52) U.S. Cl.
CPC ............ *G06Q 50/06* (2013.01); *G06Q 10/00* (2013.01); *G06Q 30/0255* (2013.01)

(58) Field of Classification Search
None
See application file for complete search history.

(56) References Cited

U.S. PATENT DOCUMENTS

| | | |
|---|---|---|
| 6,584,451 B1 * | 6/2003 | Shoham ............... G06Q 30/02 705/26.2 |
| 8,190,940 B2 | 5/2012 | Gelonese |
| D700,579 S | 3/2014 | Mobbs |
| 2002/0019802 A1 * | 2/2002 | Malme ............... G06Q 10/06 705/37 |
| 2008/0106148 A1 | 5/2008 | Gelonese |

(Continued)

FOREIGN PATENT DOCUMENTS

| AU | 2011 101402 A4 | 12/2011 |
| AU | 2012 100197 A4 | 3/2012 |

(Continued)

OTHER PUBLICATIONS

Masood et. al.; "Demand Response Scheduling by Stocastic SCUC"; IEEE Transactions on Smart Grid, vol. 1, No. 1, 89, Jun. 2010 (Year: 2010).*

(Continued)

*Primary Examiner* — Kevin H Flynn
*Assistant Examiner* — Emmett K. Walsh
(74) *Attorney, Agent, or Firm* — Craig A. Fieschko, Esq.; DeWitt Ross & Stevens S.C.

(57) ABSTRACT

A computer implemented system and method for demand management in an energy supply network including aggregation of energy use modification offers from energy consumers in order to meet value offers from energy suppliers.

19 Claims, 3 Drawing Sheets

(56) References Cited

U.S. PATENT DOCUMENTS

| | | | |
|---|---|---|---|
| 2008/0177678 A1* | 7/2008 | Di Martini | G01D 4/002 705/412 |
| 2009/0048901 A1* | 2/2009 | Richard | G06Q 10/04 705/412 |
| 2009/0235107 A1 | 9/2009 | Gelonese | |
| 2010/0095146 A1 | 4/2010 | Gelonese | |
| 2010/0156666 A1 | 6/2010 | Choi et al. | |
| 2011/0046792 A1* | 2/2011 | Imes | F24F 11/006 700/278 |
| 2011/0106687 A1 | 5/2011 | Warwick | |
| 2011/0231320 A1* | 9/2011 | Irving | G06Q 30/00 705/80 |
| 2012/0066686 A1* | 3/2012 | Koch | G06Q 10/06 718/104 |
| 2012/0080949 A1 | 4/2012 | Gelonese | |
| 2012/0123995 A1* | 5/2012 | Boot | G01R 21/1333 706/54 |
| 2012/0310860 A1* | 12/2012 | Kim | G06Q 30/08 705/412 |
| 2012/0312989 A1 | 12/2012 | Gelonese | |
| 2015/0046221 A1* | 2/2015 | Narayan | G06Q 10/06 705/7.31 |

FOREIGN PATENT DOCUMENTS

| | | |
|---|---|---|
| AU | 2012 101351 A4 | 9/2012 |
| WO | WO 2008 077198 A1 | 7/2008 |
| WO | WO 2010 139020 A1 | 12/2010 |
| WO | WO 2013 006916 A1 | 1/2013 |
| WO | WO 2013 056310 A1 | 4/2013 |
| WO | WO 2013 131147 A1 | 9/2013 |
| WO | WO 2014 094031 A1 | 6/2014 |

OTHER PUBLICATIONS

Menniti et. al.; "Purchase-Bidding Strategies of an Energy Coalition with Demand-Response Capabilities"; IEEE Transactions on Power Systems, vol. 24, No. 3, 1241, Aug. 2009 (Year: 2009).*

* cited by examiner

POWER SYSTEM

TECHNICAL FIELD

The present invention relates to the field of energy demand management and control in an electricity distribution network.

BACKGROUND ART

In a deregulated electricity market energy retailers undertake to supply electricity to consumers. The energy retailers then source this electricity from energy generators who generate the electricity using a variety of power plants, each having its own running costs and lead time to come on stream.

The price which the energy retailer pays the electricity generators for this electricity is affected by many factors including supply contracts and government regulation, but in general is driven by supply and demand. That is, in times of high demand, the price paid by the electricity retailer increases. Demand varies continuously by time of day and time of year. The price variation may be many orders of magnitude, with for example, the marginal price of an additional kWh (kilowatt hour) varying from one cent to more than ten thousand dollars.

Due to commercial realities and political constraints, and technical limitations, it is not possible for the energy retailer to simply pass on the marginal cost directly to the consumer. The cost to the consumer of a kWh is generally fixed at a price significantly greater than the lowest marginal cost payable by the energy retailer, but very much less than the maximum possible marginal cost payable by the energy retailer, generally from tens to hundreds of cents per kWh. The consumer tariff may include coarse variation by time of day and time of year, with higher prices for periods expected to be peak demand periods, but there is no direct relationship between the marginal cost paid by an energy retailer at a given time and the amount being paid by the consumer using that marginal kWh.

The energy retailer may therefore be in a position where it would be profitable if the total consumption of electricity by all of the consumers supplied by the retailer were to increase or decrease by a selected amount, within a short period of time, and for a limited duration. The energy retailer will be willing to compensate the consumer for this change. However, they have no means to communicate with the consumer, either to make the offer or to know who has accepted it.

Consumers may be willing to decrease or increase their consumption, but they have little motivation to do so, and no means to know when to make such a change.

There have been efforts to bring about the required changes in demand by providing incentives for consumers to allow direct control of air conditioning units by the energy retailer, allowing the retailer to switch units off at peak demand times. However, there is strong consumer resistance to giving up such control to an electricity utility.

A suggested solution is for the energy retailer to use price signalling, where the consumer price more closely tracks the price paid by the energy retailer, with price changes occurring every one to sixty minutes. However, few consumers are prepared to make the effort to monitor the electricity price and make continual changes to consumption. The likely outcome is little permanent change in consumption patterns, but enormous consumer dissatisfaction with the increased electricity bills caused by using discretionary use appliances at times of high demand and hence high electricity prices.

DISCLOSURE OF THE INVENTION

In one form of this invention a there is proposed a computer implemented system for demand management in an energy supply network including first receiving means adapted to receive a price offer from an energy retailer, the price offer including an offered price and a required consumption change; second receiving means adapted to receive consumption offers from a plurality of consumers, each consumption offer including a consumption change offer and a price requirement;

first aggregation means adapted to select and aggregate at least two of said consumption offers where the price requirement of the selected offers meet the offered price to produce an aggregated consumption offer which includes a consumption change offer being the sum of the consumption change offers of the selected consumption offers which meets the consumption change requirement of the price offer;

first transmission means adapted to communicate to the consumers who submitted said consumption offers included in said aggregated consumption offer instructing that the consumption changes included in the selected consumption offers be made.

Preferably, there is further included a second communication means adapted to communicate acceptance of the price offer to the energy retailer.

Preferably, there is further included means to monitor the power consumption by each of the consumers who submitted the selected consumption offers to ensure that the consumption change included in the selected consumption offer made by that consumer has been made.

BEST MODE FOR CARRYING OUT THE INVENTION

Figure 1:
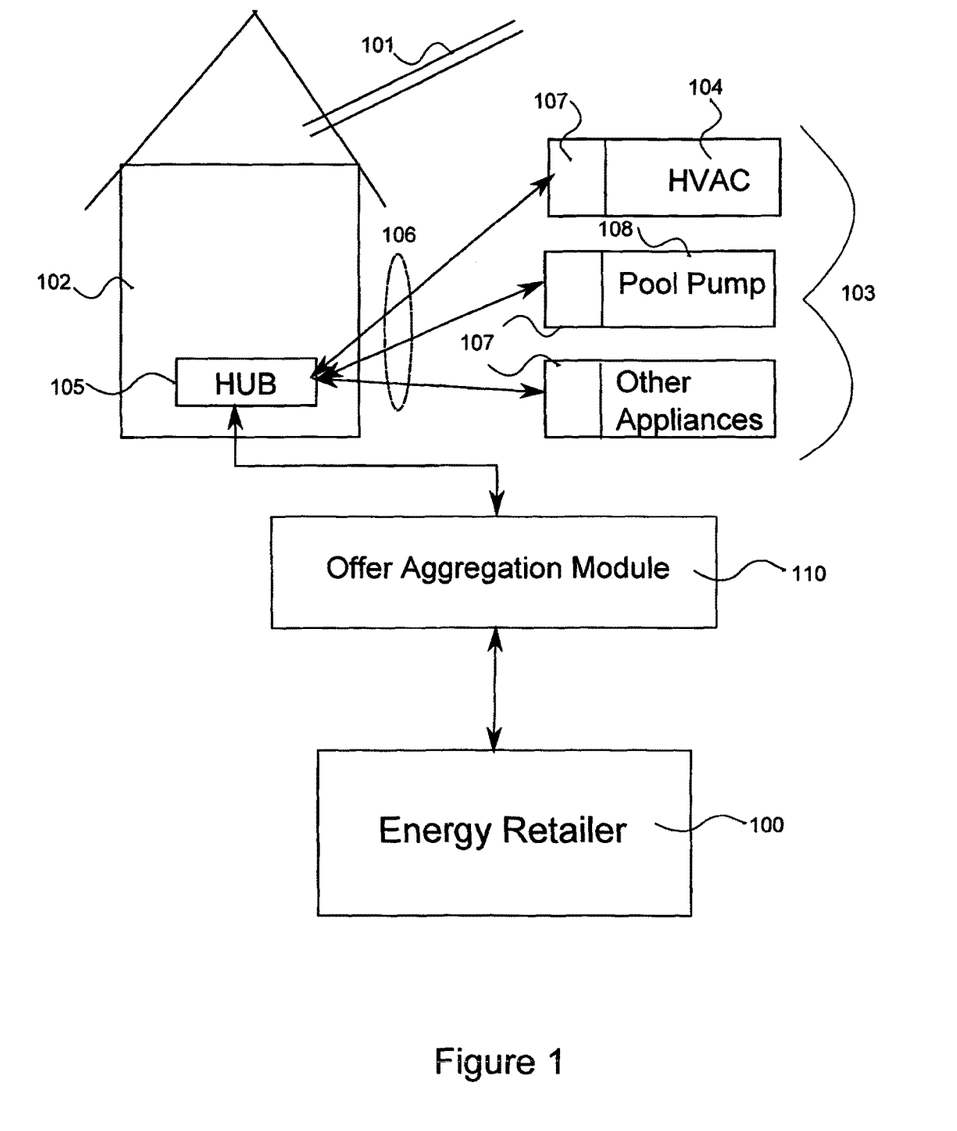
FIG. 1 is a diagrammatic representation of the system of the invention.

Now referring to the illustrations and in particular to FIG. 1, there is an energy retailer 100. The energy retailer is responsible for sourcing electricity from generators of electricity for supply to consumer premises 102. The electricity is provided to the consumer via electrical distribution grid 101.

The consumer has a demand for electricity to power one or more appliances 103. The use, or degree of use, of at least some of these appliances may be considered discretionary by the consumer. These may include such appliances as HVAC equipment 104 and swimming pool pumps 108. These appliances may be termed discretionary use appliances. Such appliances have a usage pattern which allows the overall function of the appliance to be achieved even with changes in the time or intensity of use.

Considering the example of a swimming pool pump, a consumer requires this to operate for a fixed amount of time per day, in order for the pool water to be properly filtered. However, the consumer generally has no requirement that the pump be operating at specific times. So long as the total time of operation per day is met, the consumer does not care if the pump operates during the day or at night, in a single continuous period, or a number of shorter periods.

In the case of HVAC equipment, the function the consumer requires is to keep a space at an acceptably comfortable temperature. In general, a consumer will select a temperature considered optimum. However, what is "acceptable" is subjective. Accordingly, a suitably motivated consumer may be prepared to allow the temperature to vary from the optimum in a direction which will cause the HVAC equipment to consume less power.

This compares, with non-discretionary appliances such as refrigerators, freezers and basic lighting, where any variation in time of use or intensity of use will compromise the delivery to the consumer of the function of the appliance. For example, in order for a freezer to achieve its function of keeping food frozen and unspoiled, the freezer must consume energy to maintain a set temperature. Turning the freezer off, or allowing the set temperature to rise, will compromise this function.

In the consumer premises there is provided a, hub 105. The hub includes a communication transceiver which allows the hub to communicate with corresponding transceivers in or associated with the discretionary use appliances 103 in the consumer premises. In the illustrated embodiment, the communication is via wifi links 106. Other communications links may be used, including other wireless protocols such as ZigBee. Alternative communication means such as wired Ethernet or powerline signalling systems may be used. A combination of communication links may be used, such that the hub has multiple communication transceivers.

Each of the discretionary use appliances 103 includes, or is associated with, a Communications and Control Module (CCM) 107. This CCM includes a transceiver able to communicate with the hub 105, and means to control, at least in part, the power consumption of the appliance. The nature of this control will be dependent on the nature of the appliance. For appliances such as pool pumps, only simple on/off control may be available. For HVAC equipment, the ability to control a thermostat setting may be included. Where the HVAC equipment has zone controls, these may also be available to the CCM. The CCM is able to communicate the state of the controls to which it has access, to the hub, and to receive instructions from the hub to change the state of those controls. The CCM is also able to determine, and to communicate to the hub, the current power usage of the controlled device.

The hub includes a user interface, allowing the consumer to interact with the hub. The hub is able to identify, or have identified to it by a user, all of the discretionary use appliances which it is able to control. This includes the nature of the available control in each case, and the power consumption characteristics of the appliance.

The hub is able to connect to an Offer Aggregation Module (OAM) 110, which is controlled by an aggregator. In a preferred embodiment, this connection is via the Internet, but other suitable communication systems, such as microwave or satellite links or a dedicated mesh network may be employed.

The energy retailer is also in communication with the OAM 110. This communication may be by any means and need not be continuous. In a preferred embodiment, there is direct data communication between a processing system of the energy retailer and the OAM, but this is not necessary. The communication could be undertaken, without limitation, by other means such as by telephone or text message, with human staff being used at either or both of the energy retailer and the aggregator.

The energy retailer 100, sources the electricity which the consumer, and all of the other customers of the retailer, require from electricity generators (not, shown) via an electricity market, which may take a number of forms.

For technical, commercial and political reasons, it is not generally possible for the energy retailer to implement a price regime where there is a direct, or even an approximate, relationship between the marginal cost per kWh paid by an energy retailer at a given time and the amount being paid by the consumer using that marginal kWh. Thus the wholesale price being paid by the energy retailer for the electricity is for the most part either less than, or very much more than, the price which the consumer is charged for that electricity. This means there is a benefit to the retailer in changing the amount of electricity consumed at a given instant by its customer base. In particular, there is a significant benefit to the retailer in reducing energy consumption at peak times when the retailer is paying far more per kWh than it is able to charge its customers. There is also some benefit in increasing the amount of electricity the retailer is able to sell to its customers at times of low demand, when the retailer is able to buy electricity at prices far below the price charged to the consumer.

The aggregator, via the OAM 110 facilitates transactions which provide, at least in part, a direct relationship between the cost paid by the energy retailer and the net cost of electricity to the consumer.

When the energy retailer believes that a reduction in consumption of a particular amount would increase the return to the energy retailer, the energy retailer formulates a price offer which is communicated to the OAM. At its most basic, the price offer is an offer of something of value to the consumer in return for a given reduction in electricity consumption for a given period. The value may be in any form including but not limited to reductions in price for electricity for the given period or some other period; direct money payments or bill reductions; goods, discounts on goods or vouchers for goods; services, discounts on services or vouchers for services; loyalty points redeemable for value; any other offer which may be of value. Thus there is an offered price, in return for a required consumption change.

When the hub is installed in the consumer premises and/or at any later stage, the consumer interacts with the hub to indicate what offer the consumer would accept to allow a particular control of the discretionary use appliances, and what limitations would be placed on that. These specifications are termed consumption offers.

For example, the consumer might indicate that any offer would be accepted to allow the pool pump to be turned off, so long as the pump would still run for a minimum specified number of hours for that day. Another specification might be that the air conditioning thermostat may be set one degree higher for a small discount offer, but up to five degrees higher for a large discount offer, but no change would be undertaken for any offer which is not money based. A further specification might be that for a still higher cash rebate, the air conditioner may be turned off, possibly with a limitation that this can only occur if the current temperature is less than a set value.

These consumption offers are communicated to the OAM. The OAM or the hub calculates the reduction in consumption which will occur if the particular consumption offer is taken up. This consumption reduction is recorded as part of the consumption offer. Consumption offers from all consumers who are customers of a particular energy retailer are aggregated by the OAM. This may be done for multiple energy retailers who have access to the OAM.

When the energy retailer issues a price offer, the OAM examines all of the consumption offers which it has received to determine which will be triggered by the price offer, that is, those which have a price requirement less than the price offer. The OAM accumulates the consumption offers, adding the consumption reductions until there is a sufficient reduction to meet the requirements of the price offer. This is the aggregate consumption offer.

When a match is achieved, the OAM communicates acceptance of the price offer to the energy retailer and to the hub of each consumer whose consumption offer has contributed to the aggregate consumption offer.

The hub at the premises of a consumer whose consumption offer was included in the aggregate consumption offer commands the CCM of each appliance included in the offer to undertake the required action to turn off appliances, reduce thermostat settings or such other activities as were included in the offer. The hub then monitors the reduction in power use by each of the affected appliances, for the period of time required by the price offer. Compliance or otherwise with the promised reduction in consumption is then reported to the OAM.

The OAM monitors the information returned by each of the hubs to ensure that the consumption reduction included in the aggregate consumption is achieved. This is reported to the energy retailer. When the energy retailer is satisfied that the terms of the price offer have been met, the energy retailer makes available the promise value. Depending on the nature of the value, the energy retailer may provide the value to the participating consumers directly, or may provide it to the aggregator for distribution to the participating consumers.

It has been noted that the aggregate consumption offer includes consumption offers having different price requirements, up to the price of the price offer. This means that some consumers who participate in the accepted offer may not have required the full value of the price offer to participate. The value distributed to a particular participant may be the price requirement set by that particular participant, or the value distributed may be the same for all participants.

In the event that the OAM is unable to produce an aggregate consumption offer that meets the price offer, the OAM may communicate an alternative aggregate consumption offer to the energy retailer. In its simplest form this alternative aggregate consumption offer will be a notification of the total consumption change which would be made at the price offer which the energy retailer has made. Alternatively, it may be an indication of what price offer would be required to achieve the consumption change which is desired. If accepted, this becomes the price offer and the process continues as before. Multiple iterations of price and aggregate consumption offers may occur before a match is made. If no match can be made, no action is taken by either party.

It is expected that the process of offer and counter offer will be made very rapidly, by fully or partially automated systems. However, in an embodiment, when time permits, the aggregator may attempt to form an acceptable aggregated consumption offer by communication of a price offer to consumers via each hub, requesting the consumer to enter modified consumption offers.

In order to facilitate reaching a match, the aggregator may break the price offer down into smaller price offers, each with a consumption requirement and progressively greater price offers, up to the price offer made by the energy retailer. This may be extended to the point where each consumer consumption offer is directly communicated to the energy retailer.

The aggregator may initiate the interaction with an energy retailer, by making an unsolicited aggregated consumption offer. Since the process is expected to be automated, the aggregator may make many simultaneous aggregated consumption offers, each having a different price requirement and consumption offer. Such offers may be made continually or periodically. The consumers, in setting the parameters for the control of the discretionary appliances, may have set time of day requirements or variations based on external variables such as the officially measured temperature. Accordingly, the aggregated offer which the aggregator is able to make will change with variations in time and such external variables.

Although the description has been of an offer requiring consumption decreases, the price offer may be for a consumption increase. The process would proceed in the same manner, but the outcome would be an increase in consumption. Examples of appliances which might be turned on to increase demand would be storage water or space heaters, or pool pumps which had not yet run for the required hours for the day.

In an embodiment the CCM for a particular discretionary use appliance may be integrated into the appliance at manufacture. The hub may include protocols necessary to communicate with the integrated CCM, or the hub may be able to be programmed in the field, including by the CCM, to include the necessary communications protocols.

In an embodiment, the CCM may be completely separate from the controlled appliance and may control it by controlling the power supply to the appliance. The CCM is incorporated into a plug device which is plugged between the device and the GPO (general power outlet) to which the appliance is connected. The CCM monitors the power being drawn from the GPO, and controls the device, on command from the hub, by cutting off the power supply from the GPO.

In an embodiment, the CCM may be incorporated in to a hub or into a separate device. There may be more than one device in a premises having the functions of a hub, which may be in communication with each other, and may negotiate to share or surrender each of the hub functions. For example, a device having hub functionality may include an IR blaster, being a device capable of emitting infra-red signals which emulate the signals of one or more appliance remote control devices. Such a device may allow control of a device which does not have an incorporated CCM, but which is able to be controlled by an IR remote control, such as a split system or single unit air conditioner. Since an IR blaster must be in line of sight of the controlled appliance, more than one such device may be needed in a premises, and it may be convenient for the supplied device to be the same device provided for hub functionality.

The hub may communicate to the aggregator and/or the energy retailer in order to establish formats and parameter requirements which those parties may impose upon consumption offers. Such requirements may require that the price requirement for a formal offer may be cash rebates, expressed in certain quanta. Alternatively, the only acceptable price offer might be in terms of fixed discounts per kWh for the duration of the consumption change. The hub may refuse to accept, or refuse to submit to the OAM, bids which do not meet the specified criteria. The hub may include standard control packages for particular appliances, which may be applied by default when such an appliance is detected by the hub. These default packages would be able to be altered or disabled by the consumer.

In a further embodiment, the hub may be provided as a software package able to be run on a general purpose personal computer, where such personal computer has the necessary hardware and software to communicate with the discretionary use appliances and the internet.

In further embodiments the general purpose personal computer may be a tablet computer including an iPad, or a handheld computing device such as a smartphone.

In a yet further embodiment, the hub may be provided as a web site supplied by the aggregator, which may be accessed by a user using a general purpose web browser. In this case the discretionary use appliances may be provided with means to individually access the internet in order to communicate with the hub. In an embodiment, the web site may be hosted by the energy retailer itself.

In alternative embodiments, the hub and/or the OAM may be integrated with the energy retailer's processing and control systems.

In an embodiment, the energy retailer may accept, either directly or via an aggregator, consumption offers from consumers, agreeing to provide the value required by the consumers in return for the promised consumption changes, with or without a specific consumption change target. For example, the energy retailer may accept all consumption offers until it has expended a particular value amount, rather than met a particular consumption change target.

It can be seen that the OAM, or the aggregator who may control the OAM, conducts what is in effect a market. Consumers, via the hub, place bids which include an energy consumption change offer and a price requirement to make that change. The counterparty, which may be any party operating in the energy supply market, places bids which include a consumption change requirement and a priced offered to achieve that change. The OAM then matches these bids in order to achieve a particular energy consumption change for an agreed price. The OAM may also do such further market making activities as soliciting further bids from participants, and combining bids to meet the requirements of a counterparty.

Figure 2:
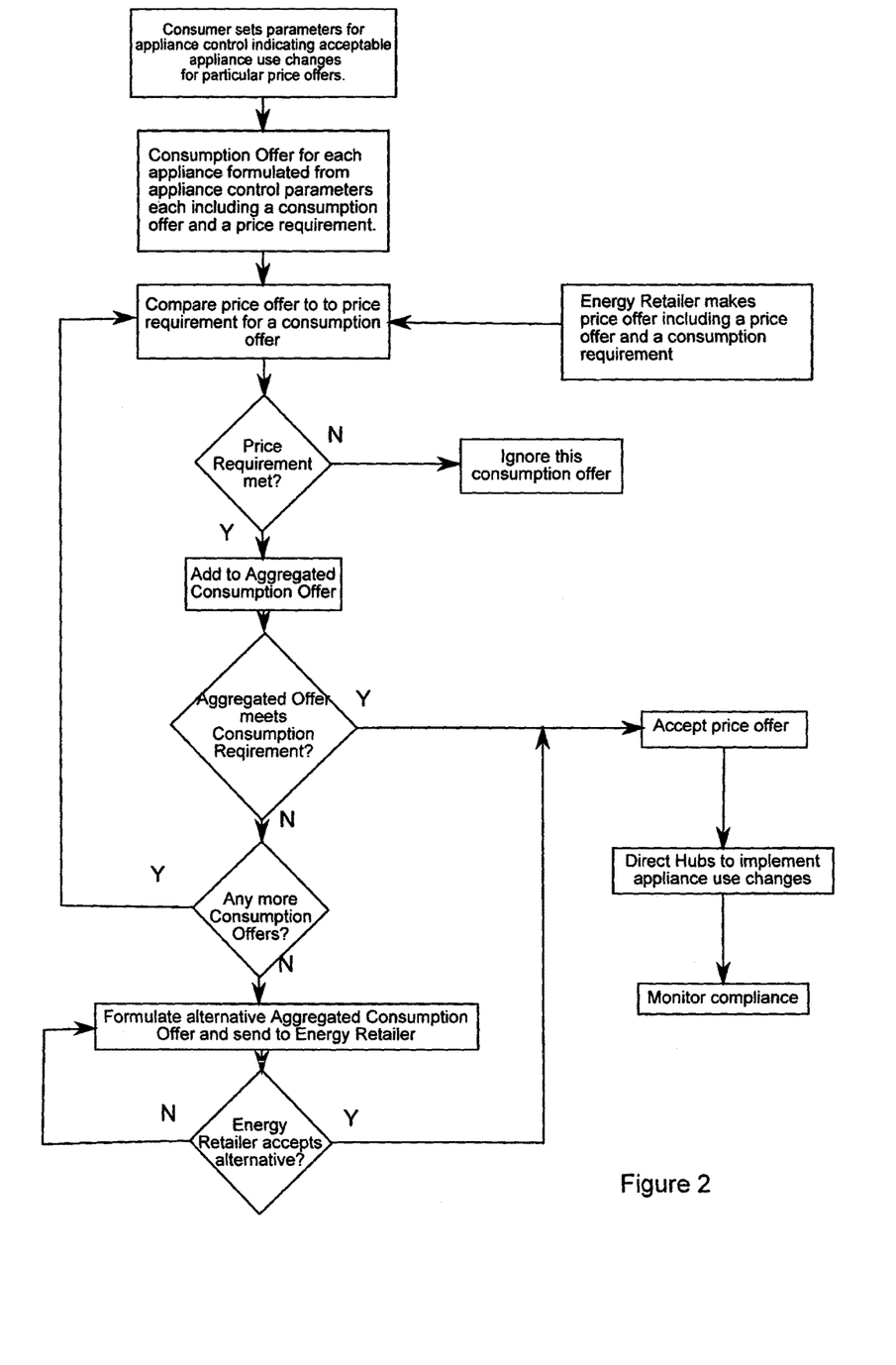
FIG. 2 is a flowchart showing the method of an embodiment of the invention.

FIG. 2 is a flowchart illustrating a method of energy demand management in accordance with the instant invention.

The method is a method by which an energy retailer with a need to change the energy demand which is being made upon the energy retailer at a particular time or for a particular time period, and a consumer with a requirement for energy which has a component which is discretionary as to the time the energy is required, or the quantity of energy required, to enter an arrangement whereby the consumer changes the demand made by the consumer upon the energy supplier in return for something of value provided by or on behalf of the energy retailer.

The consumer sets parameters associated with one or more appliances indicating what changes to the use of that device the consumer will make or allow in return for some nominated value. These may be such things as agreeing that a pool pump may be turned off in return for a cash rebate of a certain magnitude. Many other use changes could be agreed to. Based on the power consumption requirements of the appliance and the change of use parameters set, a consumption offer for that appliance is formulated containing a consumption change offer and a price requirement, indicating the value which the consumer will require from the energy retailer to make that change.

When an energy retailer requires a short term change in the level of demand the energy retailer is experiencing, the energy retailer formulates a price bid which includes the consumption change requirement, and the value which the energy retailer is prepared to offer for that change.

The price bids and the consumption offers are compared. The consumption offers which have a price requirement which falls within the range of the price offer are aggregated until the price offer is satisfied. When this occurs, the price offer is accepted, and the appliance use changes contained in those consumption offers which have been aggregated are made. The making of the changes is then confirmed for the energy retailer.

Where the price bid cannot be met, an alternative price offer may be proposed to the energy retailer. If this is accepted, the consumption offers contained in the alternative offer are carried out.

In a further feature, the hub may receive usage data from one or more discretionary use appliances, without exerting control over the appliances. This data details the use of the appliance when under the control of a user including such information as time of day used, and settings used such as power levels or thermostat settings. Such data may also be gathered from appliances whose use is not discretionary and which the hub does not have the means to control. The hub may also receive other data from other sensors or from other data sources including data such as ambient temperature, location of people within the house and time of day, week, month and year.

The hub uses the data to create a profile of the power use of each appliance and of the household overall, to the extent that the household usage data is available to the hub.

It may be advantageous for the hub to have information concerning the total electricity usage of the household. In a preferred embodiment, the premises has a Smartmeter which performs the function of metering the electricity usage of the premises. The Smartmeter includes a data communication capability which may be provided by any suitable wired or wireless protocol. In a preferred embodiment the Smartmeter includes Zigbee communication capability. The hub may be "paired" with the Smartmeter, enabling the hub to receive data detailing the electrical current flows into (or out of) the premises. The Smartmeter may also include a wide area communication capability which may be a Zigbee mesh network or any other suitable wired or wireless communication capability. The hub may make use of this wide area communication capability to communicate with the OAM.

In an alternative embodiment, the hub may include current measuring devices such as "current clamps" which are placed around the incoming electricity conductors of the premises and which allow the electrical current flowing to (or from) the premises to be measured and this information made available to the hub.

The hub may include the functionality of an In Home Display (IHD). At its simplest, an IHD displays the current usage of electrical power by a household to the householder. Commonly, an IHD will also display the cost of this usage. This information may be used by the householder to modify their electricity usage to minimize costs. In an embodiment, the hub includes a display to display IHD information. In an alternative embodiment, the hub communicates the IHD data to a separate unit for display. This separate unit may be a computing device with a communication capability, including, without limitation, an iPad®, a tablet computer and a smartphone.

Once a profile is established, the hub may control the discretionary use appliances under its control in order to maintain the profile. The hub may further make changes to the usage profile in such a manner as to reduce overall power usage, or to shift power usage away from peak usage periods. This is done without input from the user. Each appliance and/or the hub include means for a user to override the profile changes made by the hub. When a change is overridden, the hub "learns" that the change was unacceptable to the user. Over time, the hub develops an acceptable range for all controlled parameters of each appliance, having regard to such environmental factors such as ambient temperature, time and house occupancy, allowing the hub to control appliances for lower power use and/or off peak power use, without causing a nuisance to the user. This is the household management profile.

The override means may be the usual controls of the appliance, or dedicated controls to cancel the changes made by the hub to the appliance settings may be provided.

At least some details of the household management profile are communicated to the Offer Aggregation Module. This will include at least the information as to what power reductions could be made at any time without causing a nuisance to the householder. The OAM aggregates the household management profiles of multiple households to build up profiles of actual and feasible use by region, by type of household, by time of day, week, month or year, by weather conditions, and by any other parameter which is measureable and is found to be relevant to power use. The OAM may also know who are the energy retailers, distributors and generators associated with, or likely to be associated with each customer or customer group, and the data may also be aggregated against these parameters.

This aggregation allows the OAM to determine predictions for energy usage across a given region or customer type for any period into the future say the next 1, 12, 24, 36 and 48 hours. These predictions will include estimates of the likely variation range of the predicted power level. Over time the OAM will develop predictions with increasing accuracy and with increasingly accurately predicted variation ranges. Any time period for prediction may be used, but very short or very long periods may be of lesser utility.

The hub will also communicate to the OAM at least the predicted outcome of any changes to power consumption which the hub is likely to initiate in the prediction period, based on the household management profiles.

These predictions may be made available to energy market participants for a consideration. These energy market participants may be energy retailers, energy generators, or energy distributors, each of whom have an interest in accurate predictions of demand over specific time frames.

These energy market participants already make predictions based on historical consumption data as measured by the distribution and generation systems. However such predictions are unable to take account of individual household behaviour and particularly cannot account for changes introduced by the hub in accordance with the household management profiles. The predictions made by the OAM will thus be inherently more accurate than previous predictions.

Further, the OAM will take account of consumption offers made to and accepted by households in the predictions provided. This is information which has not been available before.

Using the household management profiles, the OAM is able to provide a new series of short term predictions based on the acceptance of any given price offer. This means that the energy market participants can receive a prediction of the downstream effects of any price offer. For example, it may be that a generous price offer that significantly reduces consumption at a peak period may be predicted to lead to an unacceptable peak some hours later when the appliances whose use has been delayed are brought into use. As such, a less generous price offer, over a longer period may be better to meet the requirements of the entity making the price offer.

Figure 3:
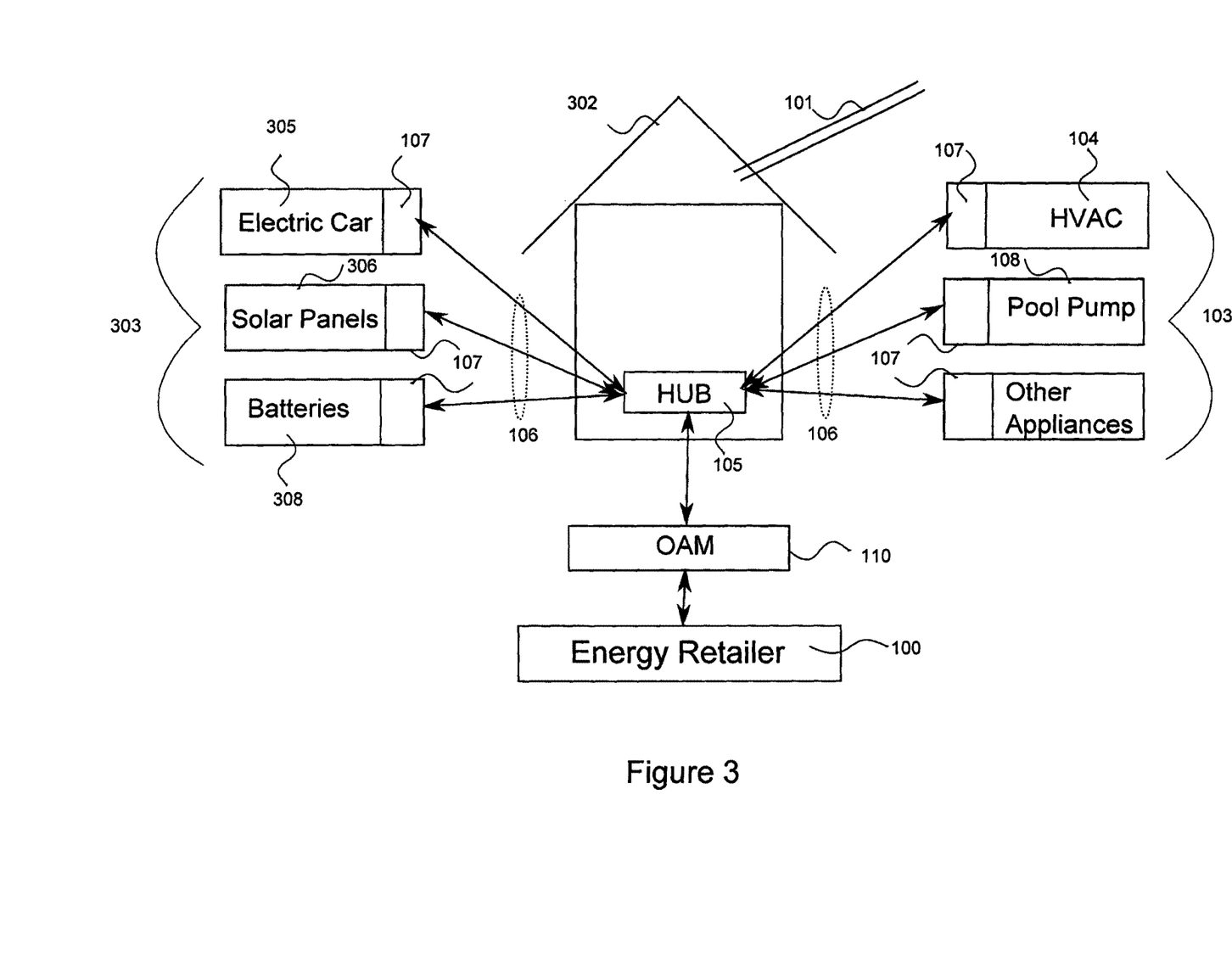
FIG. 3 is a diagrammatic representation of a further embodiment of the invention.

In a further embodiment, illustrated in FIG. 3, there is a consumer premises 302, provided with electric power via distribution grid 101. There are a number of electrical loads 103 associated with the premises. These include Heating Ventilation and Air Conditioning equipment (HVAC) 104 and pool pump 108.

Also associated with the premises are a number of storage and supply devices 303 which supply and/or store energy. These devices are connected to the premises' electricity supply and may draw energy from the electrical supply, but are capable of supplying electricity to the premises' electrical supply.

In the illustrated embodiment, there is a solar power installation 306. This installation includes solar panels for generating electricity from energy provided by the sun, and associated electrical equipment for making that electricity available to the premises and/or the electrical distribution grid. The amount of electrical power available to be supplied by the solar installation at any moment varies depending upon the amount of sunlight available to the solar panels.

The solar power installation is in communication with a hub of the type described in the description of FIG. 1 105 via a Communications and Control Module (CCM) 107. The CCM is able to communicate to the hub data concerning the electricity supply that the solar power installation is making, or is capable of making, to the premises or grid. Preferably, the CCM is also equipped to control the solar power installation as to the fraction of the available power which the installation actually does supply to the grid or premises.

There is also a battery storage installation 308. Batteries act as a storage mechanism for electrical energy, able to act as either a load, drawing energy from the grid, or as an energy source supplying energy to the premises and/or the grid. The battery storage installation is in data communication with the hub 105 via CCM 107. The CCM is able to communicate to the hub the amount of power and energy which the battery installation is able to draw or supply at any time. The CCM is then able to control the battery installation, under the control of the hub, to draw or supply energy.

Also associated with the premises is an electric car 305 which may include an intelligent charging point. The electric car has a battery of significant capacity. The car draws electrical energy from the premises to charge this battery, but it may also supply electrical energy from the battery to the premises or the grid. The car is in data communication with the hub 105 via CCM 107. The requirements of the car regarding when it must have energy available for its primary transport function, and when it may be used as an energy source for the premises, are communicated to, or deduced by, the hub. This may be done by any combination of direct user input and profile building by the hub based on past patterns of usage. The hub would also require information concerning the charging time of the car, and any technical constraints on how quickly the car may be charged or discharged. For example, a rule may be that the car must be fully charged every weekday morning, but may be discharged during the early evening. This would allow the hub to offer the supply capacity of the car to the OAM for the evening peak energy demand, even though the car is not fully charged, while leaving adequate time for the car to be charged during the night time low demand period to be fully charged by morning.

The functionality described for the electric car may be provided by the electric car alone, if the car is equipped with the appropriate software, or it may be provided by a combination of the electric car and an intelligent charging point.

It is not a requirement that the supply devices be connected in such a way as to enable electricity to, be fed back to the electricity supply grid. The electricity supplied by the supply device may be used to reduce the demand by the premises for electricity from the grid.

The hub is able to perform all of the functions as described in the description of FIG. 1. The addition of the storage and supply devices increases the number and type of price offers in which the hub may participate.

The hub 105 is in communication with the OAM 110. In addition to the information provided to the OAM by the embodiment of FIG. 1, the hub in this embodiment supplies information concerning the availability of a supply and storage capacity provided by the supply and storage devices 303. This information increases the range of price offers which the OAM may make or respond to. The availability of this alternative electrical power supply may allow the hub to participate in price offers by reducing usage of electricity supplied by the grid, without compromising the experience of the premises' occupants. Where a particular reduction in load is required, but no further discretionary use appliance loads are available to be switched off or their usage curtailed, the OAM may offer to draw some energy from the storage devices of the premises. From the point of view of the energy retailer, this is, effectively the same as a load reduction, since it is energy which the retailer no longer needs to source.

Conversely, when the price offer is one which calls for more energy to be used, the OAM may command energy to be stored in the storage devices in the premises for later use.

In preferred embodiments, where the premises is a domestic household, the hub is able to learn the energy requirements of the household and to control energy usage to achieve the minimum overall cost for that energy. The hub has the ability to monitor, learn and control key energy loads in the home without creating any, or at least minimal, householder nuisance.

The hub is able to build a profile of a household for different weather conditions, time of day, day of week and home occupancy events. The hub determines load saving and load shifting opportunities which it may execute automatically, but providing a means for the householder to override or opt out from any changes made to the operation of any appliance.

The OAM provides aggregation of this energy usage information over a number of homes, preferably a large number of homes. The OAM may build profiles of typical household energy use to build household energy usage by various criteria such as size, location or any other suitable criteria. The OAM may group households by region/load profile/etc. This information may be used by an aggregator to facilitate energy retailers acquiring customers whose energy use is complementary to the energy use patterns of other of the retailer's customers such that overall the total load profile for the retailer more closely matches the optimum load profile for the retailer's profitability.

The OAM is thus able to provide rolling 24 hour predictions of energy usage levels across all aggregated homes or across only customers of a particular retailer or generator or distributor; or only those customers in a particular region; or those households of a particular makeup; that is across any grouping where that information might be of value to another market participant.

These predictions would be augmented with information on energy usage adjustment opportunities either per household or preferably aggregated so as to present to the interested market participant (retailer/generator/distributor/etc) information as to what energy load shifting is possible with a price offer presented to the aggregator for implementation in the aggregated households.

The OAM may present information to the market participant as to the price offer which would be required from that market participant to increase or decrease loads by a certain level based on the household loads which the aggregator is able to control via the OAM and the household hubs.

The rolling forecast can be updated with any changes in the predicted household loads which will occur because of the household accepting any price offer to increase or decrease loads.

This rolling 24 hour information may be used by the market participant as the basis for action in the energy trading market.

The illustrated embodiments refer to energy retailers, but any energy market participant, referred to generally as energy suppliers, may be the counterparty accepting the consumer's energy consumption reduction offer.

A further market participant is electricity distributors. Distributors are responsible for "poles and wires" and transmission plant which carries electricity from the generators to the households. A distributor's capacity and/or the demand on that capacity may not be evenly spread over a geographic area. For example, there may be a concentration of high capacity air conditioners in a particular suburb, which is supplied with electricity from a single substation. In hot weather, this substation may be overloaded, even when the overall electricity demand on the grid is not excessive. A distributor may be prepared to make a price offer to households served by that substation, and no others, to reduce electricity consumption. The OAM is provided with information as to where each premises with a hub is geographically, and which distributor is responsible for the electricity supply to that premises. The OAM is thus able to formulate a consumption reduction offer, or pass on a price offer, to/from only those households. Many other similar geographically limited offer scenarios are possible.

The aggregator may enter the energy market directly as a participant. The aggregator has control of energy supplies in the form of the energy supply devices, and the ability to reduce loads. These may be traded as capacity directly into an energy trading market, where a reduction in load is the equivalent of a supply.

In an alternative embodiment, the OAM does not aggregate the consumption offers from the householders in response to the market participant's price offer, but acts as a communication channel. Price offers are passed directly to household hubs, the hub responds, and the response from each hub is passed to the market participant.

A further market participant is insurers. Direct market participants such as retailer's and generators often do not wish to take the financial risks. Retailers may be concerned that price peaks of many orders of magnitude above ordinary pricing may be impossible to meet. Generators, having equipment only used in those peaks may be concerned that if such peaks do not occur, they may not get any use from their expensive capacity. These and other participants use insurers to take on these risks. These insurers cannot participate directly in the energy markets, but they have a great interest in the movement of the markets. In an embodiment, an insurer will pay the aggregator to ensure that demand stays low enough that insurance contracts to retailers are not activated.

In an embodiment, the OAM keeps records of what offers particular householders are receiving and which offers they are unable to take due to not having any supply or storage devices, or not having implemented control of particular loads in the household. The OAM or the aggregator may then recommend to the householder what additional equipment should be installed and what the overall economic benefit would be likely to be.

Although the invention has been herein shown and described in what is conceived to be the most practical and preferred embodiment, it is recognised that departures can be made within the scope of the invention, which is not to be limited to the details described herein but is to be accorded the full scope of the appended claims so as to embrace any and all equivalent devices and apparatus.

It is to be understood that any prior art publication that is referred to does not constitute an admission that the publication forms a part of the common general knowledge in the particular field, either in Australia or any other country.

The claims defining the invention are as follows:

1. A computer implemented system for demand management in an energy supply network, the system being a computer configured to:
   a. receive a price offer from an energy retailer, the price offer including:
      (1) a consumption change requirement representing a change in energy consumption requested of energy consumers, and
      (2) an offered price representing value to be given to the energy consumers in return for the required consumption change;
   b. receive consumption offers from several energy consumers, each consumption offer including:
      (1) a consumption change offer representing energy consumption limitations that an energy consumer would accept for one or more energy-consuming devices, and
      (2) a price requirement representing value required by the energy consumer in return for the energy consumption limitations;
   c. produce an aggregated consumption offer from selected consumption offers wherein:
      (1) the sum of the price requirements of the selected consumption offers is less than or equal to the offered price of the price offer, and
      (2) the sum of the consumption change offers is greater than or equal to the consumption change requirement of the price offer;
   d. control one or more energy-consuming devices of the energy consumers who submitted the selected consumption offers, whereby these energy-consuming devices meet the energy consumption limitations of the consumption change offer.

2. The system of claim 1 further configured to monitor the power consumption of the energy consumers who submitted the selected consumption offers for compliance with the consumption change offers included in the selected consumption offers.

3. The system of claim 1 further configured to communicate instructions to the energy consumers who submitted the selected consumption offers to make the energy consumption limitations included in the selected consumption offers.

4. The system of claim 1 further configured to communicate acceptance of the price offer to the energy retailer following production of the aggregated consumption offer.

5. The system of claim 1 further including:
   a. several hub devices, each hub device being configured to receive consumption offers from one of the several energy consumers, and
   b. an Offer Aggregation Module configured to
      (1) receive the price offer from the energy retailer, and
      (2) produce the aggregated consumption offer.

6. The system of claim 5 wherein each of the hub devices is separate and spaced from:
   a. the Offer Aggregation Module, and
   b. the other hub devices.

7. The system of claim 1 further including a hub device configured to:
   a. receive one or more of the consumption offers from one of the several energy consumers, and
   b. wirelessly communicate with one or more energy-consuming devices.

8. The system of claim 7 wherein the hub device is further configured to monitor the power consumption of the energy-consuming devices for compliance with the consumption change offer of the energy consumer's consumption offer.

9. The system of claim 1 further including:
   a. several hub devices, each hub device being configured to:
      (1) receive one or more of the consumption offers from the several energy consumers, and
      (2) monitor the power consumption of the energy consumers who submitted the selected consumption offers for compliance with the consumption change offers included in the selected consumption offers; and
   b. an Offer Aggregation Module configured to
      (1) receive the price offer from the energy retailer, and
      (2) produce the aggregated consumption offer.

10. The system of claim 1 further including a hub device configured to:
    a. receive energy usage data from an energy-consuming device;
    b. receive energy cost data characterizing the cost of energy used by the energy-consuming device at the time of usage;
    c. at least partially control the operation of the energy-consuming device in a manner whereby the device's cost of energy usage is reduced.

11. The system of claim 10, wherein the hub device is configured to calculate predicted energy usage of the energy-consuming device over a defined future period.

12. The system of claim 10, wherein the hub device is configured to receive one of the consumption offers from one of the several energy consumers.

13. The system of claim 10, wherein the hub device is configured to monitor the power consumption of the energy consumers who submitted the selected consumption offers for compliance with the consumption change offers included in the selected consumption offers.

14. The system of claim 10, wherein the hub device is a computer.

15. A method for demand management in an energy supply network including the steps of:
    a. collecting, with a processor, price offers from energy retailers, each price offer including:
       (1) a consumption change requirement representing a change in energy consumption requested of energy consumers, and (2) an offered price representing value to be given to the energy consumers in return for the required consumption change;
b. collecting, with the processor, consumption offers from energy consumers, each consumption offer including:
  (1) a consumption change offer representing energy consumption limitations that an energy consumer would accept for one or more energy-consuming devices, and
  (2) a price requirement representing value required by the energy consumer in return for the energy consumption limitations;
c. aggregating, with the processor, consumption offers from one or more selected energy consumers such that:
  (1) the sum of the consumption change offers is at least as great as the consumption change requirement, and
  (2) the offered price is at least as great as the sum of the price requirements;
d. controlling, with the processor, the energy-consuming devices of one or more of the selected energy consumers who submitted the selected consumption offers, such that the energy-consuming devices meet the energy consumption limitations of the consumption change offer.

16. The method of claim 15 further including the step of monitoring, with the processor, the selected consumers' energy consumption to confirm that each selected consumer has complied with the selected consumer's consumption change offer.

17. A hub device computer configured to:
a. receive energy usage data from an energy-consuming device;
b. receive energy cost data characterizing the cost of energy used by the energy-consuming device at the time of usage;
c. receive a consumption offer from an energy consumer, the consumption offer including:
  (1) a consumption change offer representing energy consumption limitations that the energy consumer would accept for the energy-consuming device, and
  (2) a price requirement representing value required by the energy consumer in return for the energy consumption limitations;
d. receive a price offer from an energy retailer, the price offer including:
  (1) a consumption change requirement representing a change in energy consumption requested of energy consumers, and
  (2) an offered price representing value to be given to the energy consumers in return for the required consumption change;
e. produce an aggregated consumption offer from selected consumption offers which have:
  (1) price requirements whose sum is less than or equal to the offered price of the price offer, and
  (2) consumption change offers whose sum is greater than or equal to the consumption change requirement of the price offer;
f. monitor the power consumption of the energy-consuming device for compliance with the consumption change offer of the energy consumer's consumption offer;
g. at least partially control the operation of the energy-consuming device to meet the consumption change offer of the energy consumer's consumption offer, whereby the device's cost of energy usage is reduced.

18. The hub device computer of claim 17 further including a wireless transceiver configured to wirelessly:
a. receive the energy usage data and the energy cost data, and
b. at least partially control the operation of the energy-consuming device.

19. The hub device computer of claim 17 further configured to calculate predicted energy usage of the energy-consuming device over a defined future period.

* * * * *